US012498099B1

(12) United States Patent
Li

(10) Patent No.: US 12,498,099 B1
(45) Date of Patent: Dec. 16, 2025

(54) DECORATIVE LAMP

(71) Applicant: Xiongyan Li, Zhejiang (CN)

(72) Inventor: Xiongyan Li, Zhejiang (CN)

( * ) Notice: Subject to any disclaimer, the term of this patent is extended or adjusted under 35 U.S.C. 154(b) by 0 days.

(21) Appl. No.: 19/271,919

(22) Filed: Jul. 17, 2025

(51) Int. Cl.

| | |
|---|---|
| ***F21V 1/14*** | (2006.01) |
| ***F21V 1/26*** | (2006.01) |
| ***F21V 21/08*** | (2006.01) |
| ***F21V 23/00*** | (2015.01) |
| ***F21W 121/00*** | (2006.01) |
| ***F21Y 103/10*** | (2016.01) |
| ***F21Y 115/10*** | (2016.01) |

(52) U.S. Cl.
CPC .................. *F21V 1/14* (2013.01); *F21V 1/26* (2013.01); *F21V 21/08* (2013.01); *F21V 23/002* (2013.01); *F21W 2121/00* (2013.01); *F21Y 2103/10* (2016.08); *F21Y 2115/10* (2016.08)

(58) Field of Classification Search
CPC ... F21V 21/08; F21V 1/14; F21V 1/26; F21V 23/002
USPC ............................ 362/812; 40/550–552, 574
See application file for complete search history.

(56) References Cited

U.S. PATENT DOCUMENTS

| | | | | |
|---|---|---|---|---|
| 7,086,769 B1 * | 8/2006 | Thompson | G02B 6/0001 | 40/550 |
| 7,162,821 B2 * | 1/2007 | Venkataraman | G09F 13/04 | 40/552 |
| 2003/0182833 A1 * | 10/2003 | Lewis | G09F 13/0404 | 40/574 |
| 2008/0016734 A1 * | 1/2008 | Basha | G09F 13/04 | 40/552 |

* cited by examiner

*Primary Examiner* — Thomas M Sember
(74) *Attorney, Agent, or Firm* — Hawaii Patent Services; Nathaniel K. Fedde; Kenton N. Fedde

(57) ABSTRACT

The present disclosure discloses a decorative lamp. The decorative lamp comprises an integrally injection-molded base plate, a pre-formed light panel, and a strip-shaped lampshade. The base plate is provided with a lamp groove matching a target design, with the inner wall of the lamp groove constrained by a side wall. The light panel is integrated with light-emitting elements and precisely fits the contour of the lamp groove. During assembly, only placing the light panel into the lamp groove and pressing in the lampshade is required, eliminating the need for welding or adhesive bonding. This design achieves customized graphic display through structural synergy, significantly simplifying the assembly process, reducing production costs, and enhancing product reliability and light efficiency consistency, making it suitable for scenarios such as fan support signs and commercial signage.

20 Claims, 15 Drawing Sheets

DECORATIVE LAMP

TECHNICAL FIELD

The present disclosure relates to the technical field of decorative lighting fixtures, particularly to a decorative lamp, which has the advantages of simple installation and high safety.

BACKGROUND

Currently, the typical structure of letter lamps on the market is as follows: a lamp groove is processed on the base plate according to a preset letter shape (usually using techniques such as engraving or CNC milling). During installation, segmented flexible light strips in a coiled state need to be manually cut and fixed to the base plate, and then connected to a power source.

However, this traditional structure has significant drawbacks:

1. Complex assembly and low reliability: It relies on manual physical splicing of multiple segments of flexible light strips within the lamp groove, making it highly prone to frequent contact failures due to misalignment, loose connectors, or poor soldering.
2. Complex process and high cost: The production requires manual cutting of light strips and sealing strips from coiled materials, followed by segment-by-segment bonding and fixing. This process is inefficient, with labor costs accounting for a significant portion.
3. Poor adaptability and difficult installation: When the lamp groove involves small bending radii or continuous complex curves, rigid/semi-rigid segmented light strips struggle to fit perfectly. Workers are often forced to further cut the light strips and sealing strips into shorter segments, or even use temporary "flying wire" connections between some small segments. This not only significantly increases labor time and difficulty but also introduces additional points of connection failure risk.
4. Fragile structure and significant safety hazards: The adhesive sealing strips, as the primary fixing method, are prone to detachment due to stress, temperature changes, or aging during subsequent handling, installation, and use of the letter lights. Once the sealing strips fail, the light strips may shift, loosen, or even expose live components, posing serious electrical (e.g., short circuits, electric shocks) and mechanical (e.g., tripping, falling parts) safety risks.

SUMMARY

The present disclosure provides a decorative lamp to address the issues raised in the background above.

To achieve the aforementioned object, the present disclosure adopts the following technical solution:

The present disclosure relates to a decorative lamp, comprising a base plate provided with a lamp groove, wherein the lamp groove is formed along a path of a predetermined design and has an inner cavity contour and an inner wall; an integrally formed light panel having a shape matching the inner cavity contour of the lamp groove and provided with a light-emitting element, the light panel being entirely placed within the lamp groove; a lampshade covering the lamp groove and being connected to the base plate. The lampshade comprises: an embedded part located within the lamp groove and abutting against the inner wall of the lamp groove to constrain a position of the lampshade itself. The light panel is accommodated within the lamp groove, such that the lampshade, through the abutment of the embedded part with the inner wall of the lamp groove, constrains the light panel within the lamp groove.

The beneficial effects of the present disclosure compared to existing technology are as follows: Through the collaborative design of three core components (base plate, integrated light panel, mechanically interlocked lampshade), a breakthrough in production technology is achieved, eliminating the need for splicing or adhesive bonding and enabling rapid two-step assembly. This primarily addresses issues such as fragile splicing points, adhesive aging failure, and complex assembly processes in traditional decorative lamps.

BRIEF DESCRIPTION OF DRAWINGS

The drawings, which form part of this application, are included to provide further understanding of the present disclosure. The illustrative embodiments and the descriptions thereof serve to explain the present disclosure and do not constitute undue limitations. In the drawings.

REFERENCE SIGNS

Figure 1:
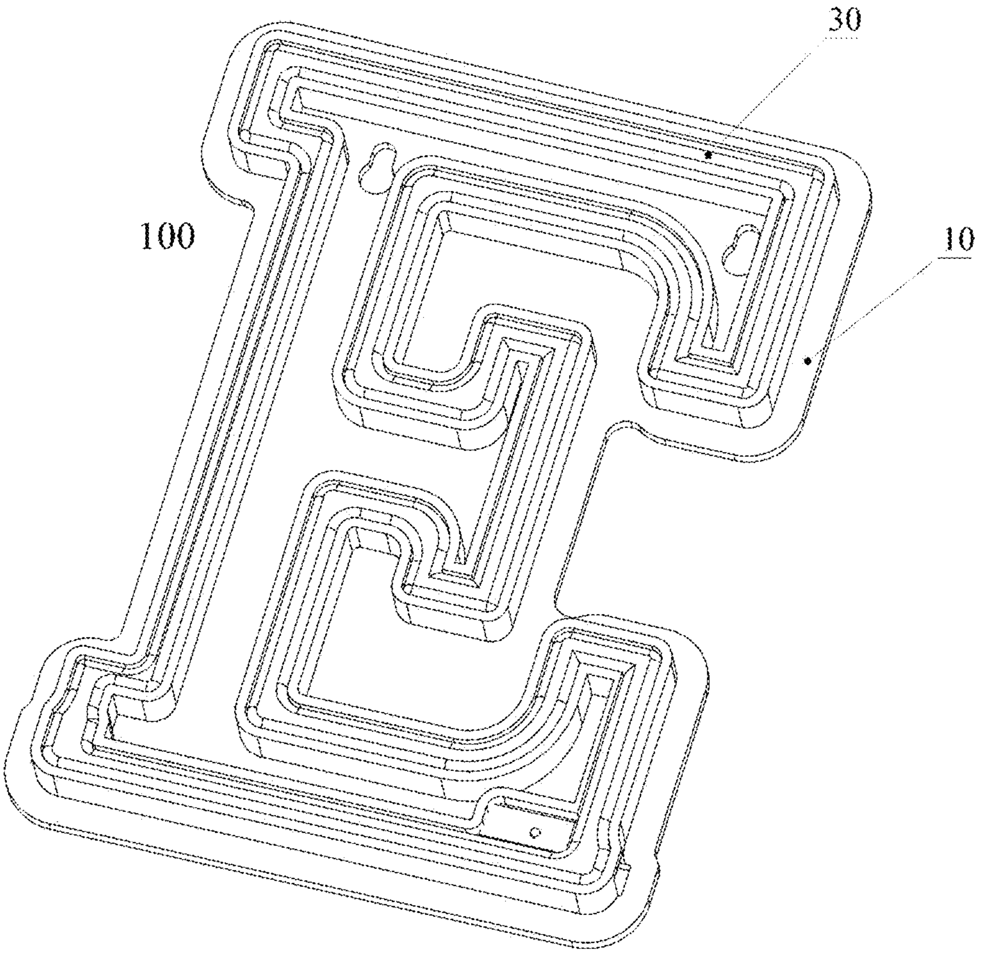
FIG. 1 is a perspective schematic diagram of a decorative lamp according to Embodiment 1 of the present disclosure.

Decorative lamp 100;

Base plate 10, Top surface 101, First penetrating hole 102, First aperture 1021, Second aperture 1022, Second penetrating hole 103, Lampshade 30, Side wall 104, Lamp groove 105, Light panel 106, Light-emitting element 1061, Control module 1062, Control button 10621, Charging port 1063, Embedded part 301, Exposed part 302, Limiting groove 303, Control opening 304;

Neon lamp 200; Bottom shell plate 50; Lamp cover 60; Top end surface 501; Extending wall 502; Accommodation groove 503; Light-emitting panel 70; Light-emitting device 701; Control component 702; Operation button 7021; Covered part 601; Uncovered part 602; Covered groove 603; Abutment block 604; Through hole 605.

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Referring to the drawings, according to an exemplary embodiment, a novel decorative lamp structure is shown. This design fundamentally abandons the methods of segmented splicing and adhesive fixation, aiming to eliminate splicing points and fragile bonding structures.

As shown in FIG. 1, this exemplary embodiment illustrates the specific structure of a decorative lamp 100. The decorative lamp 100 primarily consists of: a base plate 10, a light-emitting component (not shown) mounted on the base plate 10, and a lampshade 30 that covers the light-emitting component and is connected to the base plate 10. The base plate 10, the light-emitting component, and the lampshade 30 work together to clearly present a preset pattern to the user. For example, FIG. 1 demonstrates the lighting effect of the decorative lamp 100 forming the letter "E." This preset pattern is mainly achieved through specially designed light-transmitting areas (or light-shielding patterns) on the lampshade 30. When the light-emitting component is illuminated, light projects through specific areas of the lampshade 30 to display the desired graphic outline.

It should be noted that the decorative lamp 100 described in this disclosure has a wide range of applications, with its core feature being the ability to display customized graphics through the aforementioned structure. Typical application examples include but are not limited to: fan support signs (e.g., fan gatherings, concert venues), commercial signage (store logos, advertisements), ambient decorative lamps (festive decorations, home accents), and indicator lights. Its core value lies in the flexible and efficient display of specific patterns or textual information as required by the user.

Figure 2:
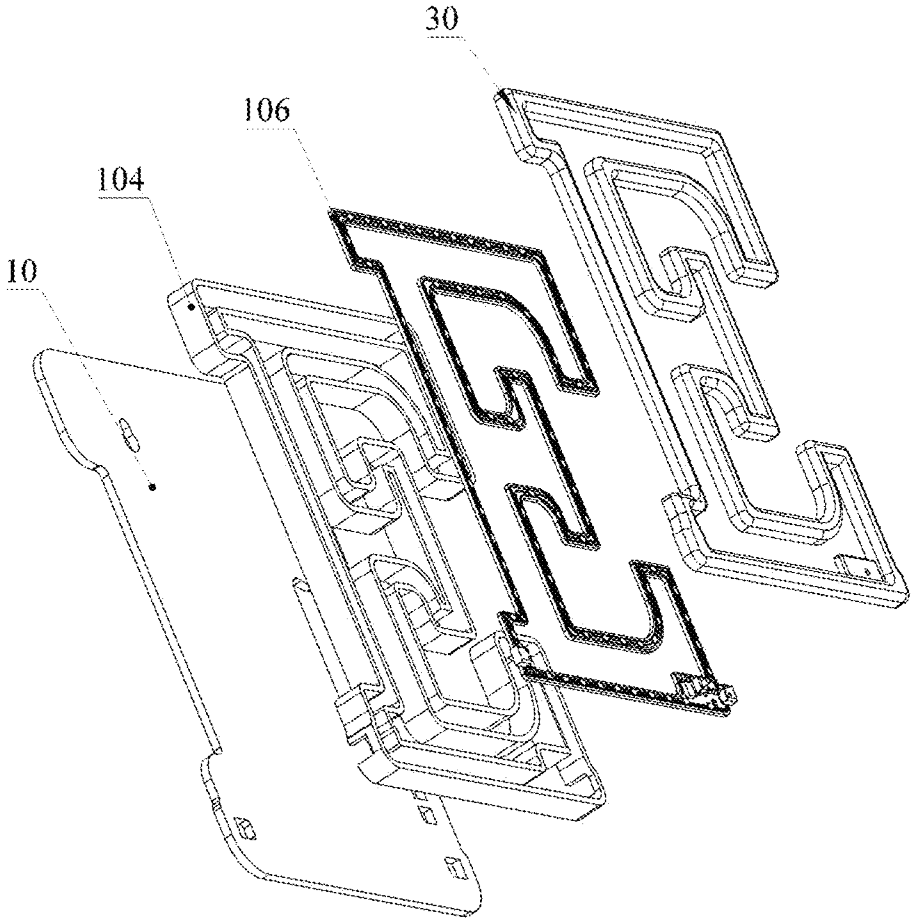
FIG. 2 is an exploded view of the decorative lamp shown in FIG. 1.
Figure 3:
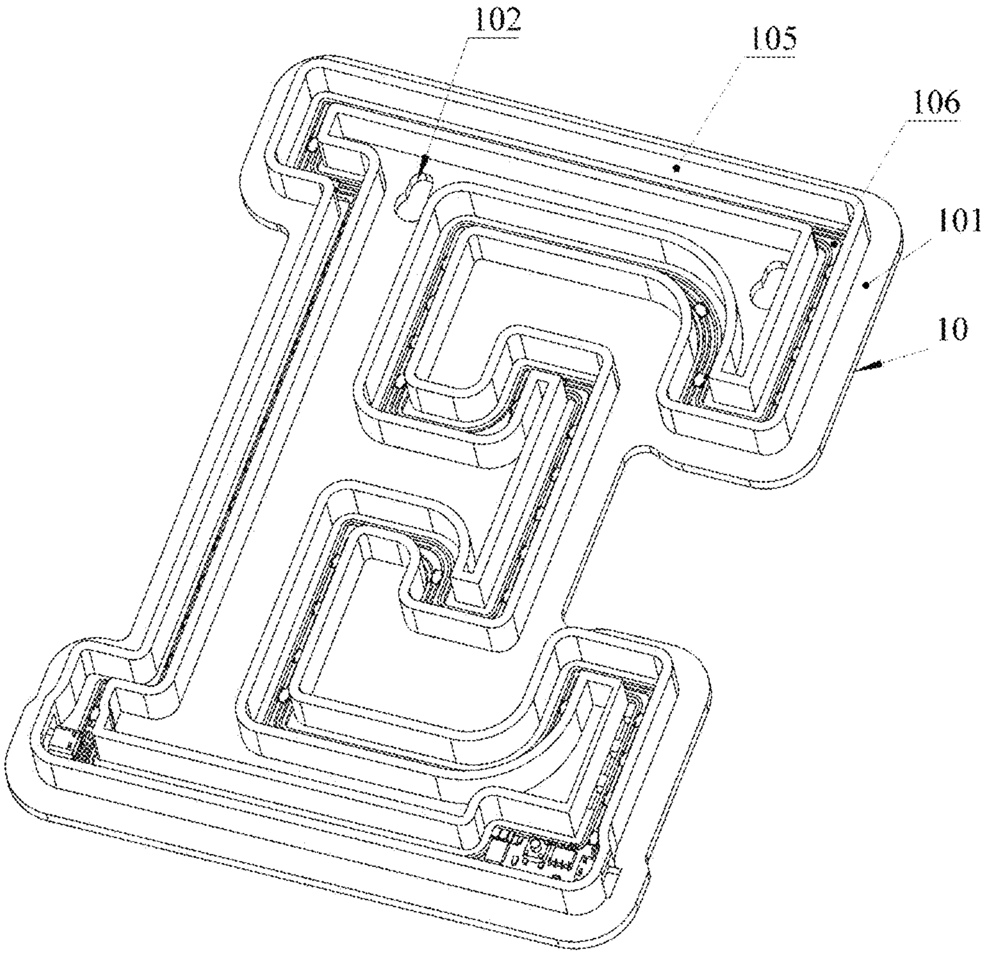
FIG. 3 is a schematic structural diagram of a light panel shown in FIG. 2 placed in the lamp groove.

Please refer to FIGS. 2 and 3. The base plate 10 of the decorative lamp in this application serves as its core supporting structure and is manufactured using an integrated injection molding process. This process not only ensures that the base plate 10 has excellent overall structural strength and load-bearing capacity, significantly improving the durability and lifespan of the decorative lamp 100, but also facilitates the realization of complex shapes. The overall shape of the base plate 10 is meticulously designed to closely resemble the target pattern to be displayed by the decorative lamp (e.g., the letter "E" in FIG. 1). This design coherence makes the base plate itself a part of the aesthetic appeal, significantly enhancing the overall visual beauty and thematic expressiveness of the decorative lamp 100.

The base plate 10 has a top surface 101 and a bottom surface (not shown). For convenient hanging, the upper part of the base plate 10 is provided with two first penetrating holes 102. These apertures run through the base plate 10, connecting the top surface 101 and the bottom surface. The center-to-center distance between the two first penetrating holes 102 is precisely controlled within the range of 8-12 cm. This standardized spacing design accommodates common hanging hook distances, improving the product's versatility.

Figure 4:
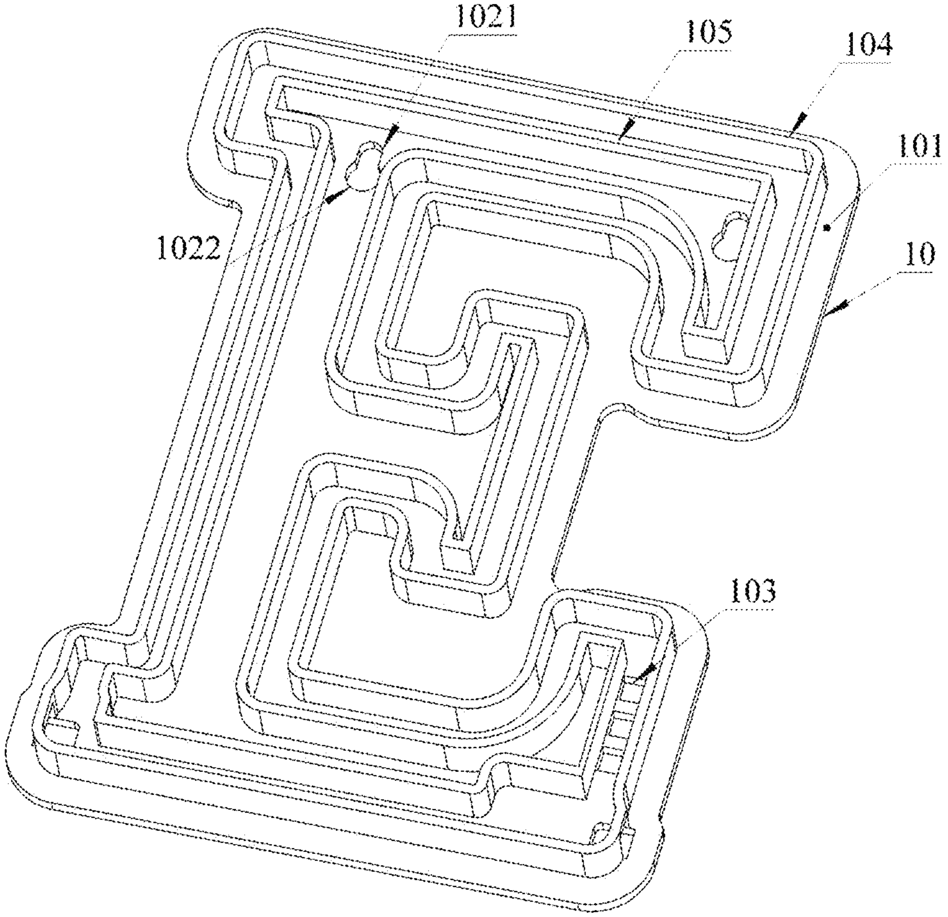
FIG. 4 is a schematic structural diagram of a base plate and a lamp groove shown in FIG. 3.

Please also refer to FIG. 4. Each first penetrating hole 102 consists of two parts (as clearly shown in FIG. 4): the first aperture 1021 is located in the upper part, with its aperture size smaller than the second aperture 1022 below. One side of the first aperture 1021 is designed as a semicircle to facilitate the entry of a hook or provide positioning in a specific direction. The second aperture 1022 is directly below the first aperture 1021, featuring a circular structure with a larger size. The first aperture 1021 and the second aperture 1022 overlap vertically and are interconnected, forming a continuous hanging channel. This composite structure, smaller at the top and larger at the bottom, aids in securing or guiding the hanging component.

In the lower half of the base plate 10, three second penetrating holes 103 are arranged. These apertures also penetrate the base plate 10, connecting the top surface 101 with the bottom surface, and are designed in a square shape overall. The three second penetrating holes 103 are spaced longitudinally (top to bottom) along the base plate 10. The center-to-center distance between adjacent second penetrating holes 103 is controlled within the range of 0.3-1 cm. This compact and precise spacing provides wiring flexibility. The primary function of the second penetrating holes 103 is to serve as entry and exit points for power cords, enabling the internal lighting components of the decorative lamp 100 to safely connect via wires to external power sources or control devices. When the power cord used for connection is short, users can select the second penetrating hole 103 closest to the internal lighting component's connection point (usually the highest one) as the wiring port. This maximizes the use of the short cord length, preventing connection failures due to insufficient length. When the power cord is longer, users can flexibly choose a lower-positioned second penetrating hole 103 as the wiring port based on the actual location of external devices (e.g., sockets, controllers). This design significantly optimizes the user experience: it effectively reduces the exposed length of the power cord between the decorative lamp 100 and external devices, minimizes cable clutter, ensures a cleaner and more aesthetically pleasing installation, and greatly simplifies cable management, enhancing the product's practicality and spatial coordination.

Specifically, on the top surface 101 of the base plate 10, two sets of upward-extending side walls 104 (i.e., extending away from the base plate 10) are arranged. These two sets of side walls 104 collectively form a lamp groove 105 for accommodating a light-emitting component (such as an LED strip). The side walls 104 are manufactured using an integrated injection molding process with the base plate 10, ensuring structural integrity and strength. The wall height of all side walls 104 remains consistent, and the actual depth of the lamp groove 105 equals this wall height, both designed within the range of 0.5-1 centimeters (cm). This depth range is optimized to effectively conceal and protect the light-emitting component while allowing moderate light transmission, creating a clear light path outline.

Figure 5:
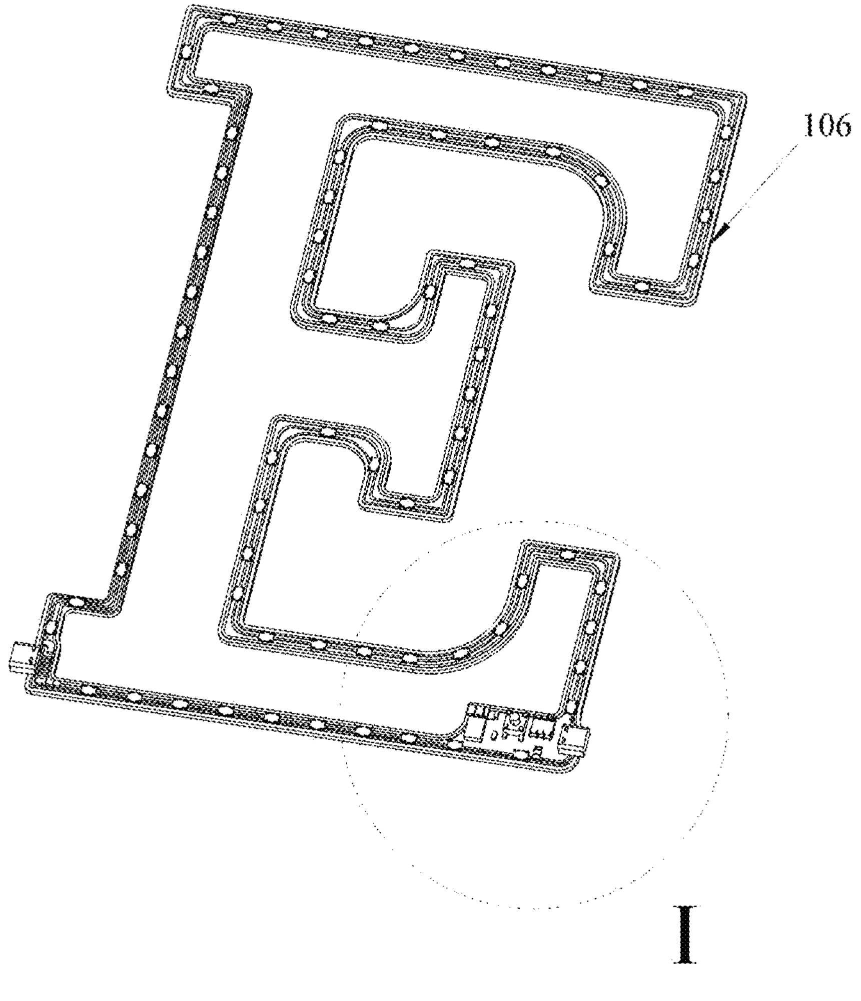
FIG. 5 is a perspective schematic diagram of the light panel shown in FIG. 2.
Figure 6:
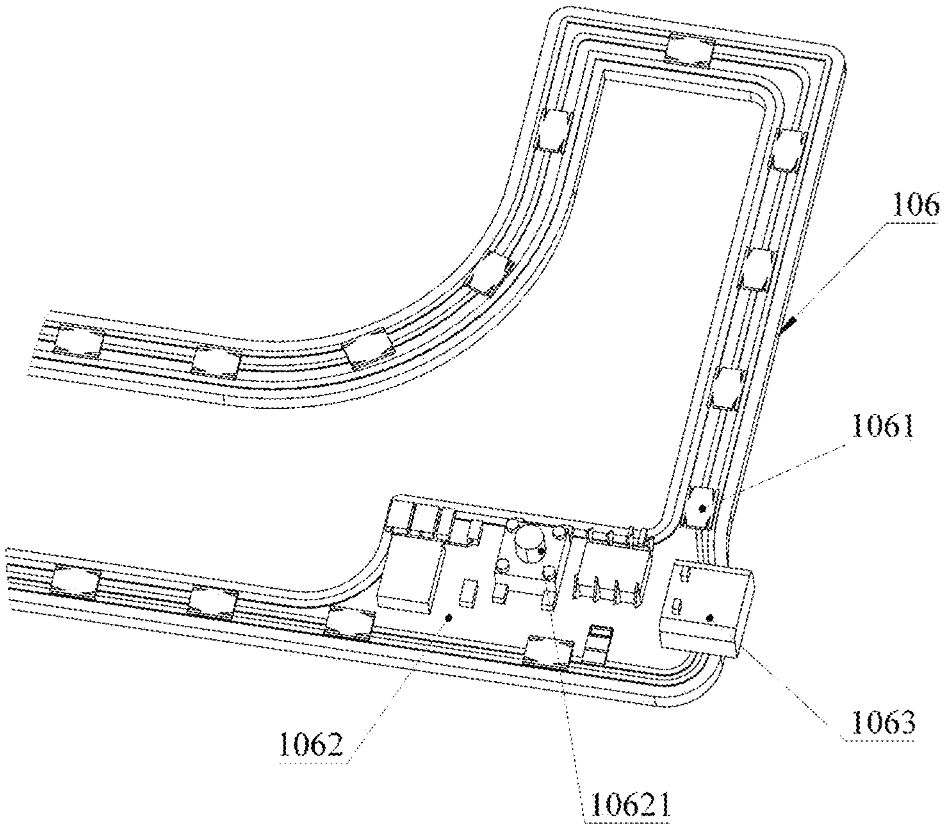
FIG. 6 is an enlarged view of part I shown in FIG. 5.
Figure 7:
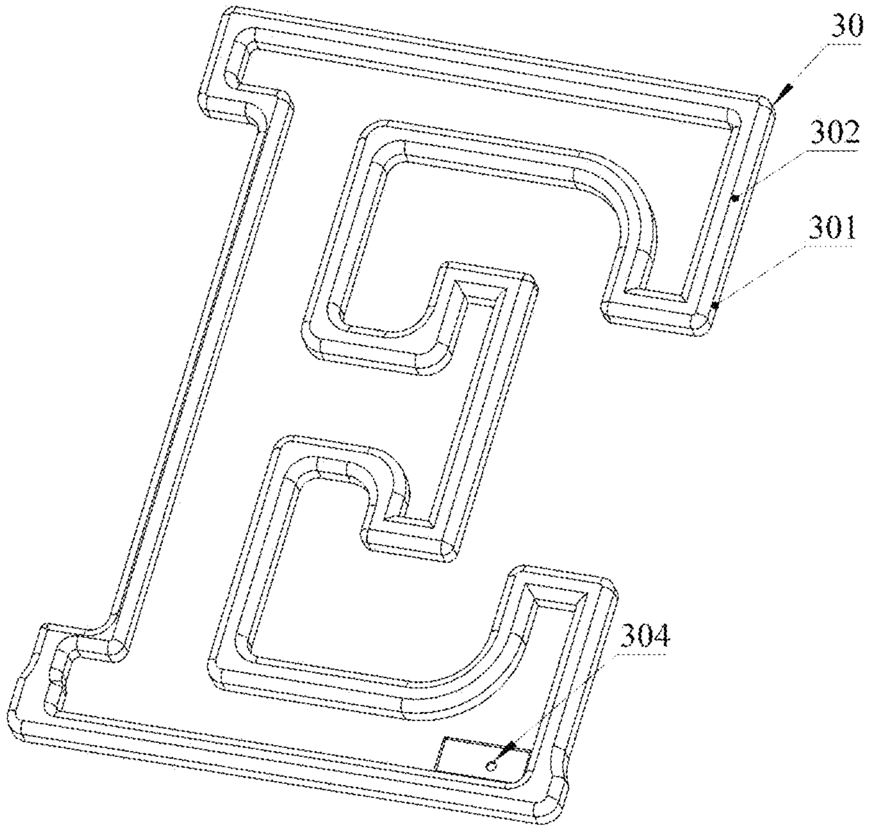
FIG. 7 is a perspective schematic diagram of a lampshade shown in FIG. 2.

The core of this design lies in the path planning of the lamp groove 105. As shown in FIG. 4, the overall path of the lamp groove 105 is meticulously designed to closely match the target decorative design (e.g., an "E" shape). When users view the decorative lamp 100 from above, the clearly discernible path of the lamp groove, outlined by the light-emitting component, intuitively presents the predetermined target design (such as the letter "E"). It is important to emphasize that the target design is highly flexible and not limited to the "E" example, and it can be designed as any letter (e.g., A, B), number, symbol, or specific pattern shape (as shown in FIGS. 5, 6, and 7) depending on actual application requirements.

In this embodiment, a first penetrating hole 102 is specially arranged. This hole is located within the design path formed by the lamp groove 105 (e.g., between the strokes of the "E" shape). Notably, the path of the lamp groove 105 is essentially arranged around the first penetrating hole 102. The primary purpose of the first penetrating hole 102 is to provide a hanging point, facilitating the installation and fixation of the decorative lamp 100 (e.g., for rope suspension). Its position is carefully selected to ensure it lies in the "blank" area formed by the path of the lamp groove, thus completely avoiding interference with the arrangement and light effects of the light-emitting component in the lamp groove 105, nor significantly affecting the structural strength of the base plate 10. This means that, while fulfilling the hanging function, the specific position of the first penetrating hole 102 on the base plate 10 can be flexibly adjusted based on design requirements and mechanical analysis.

Figure 8:
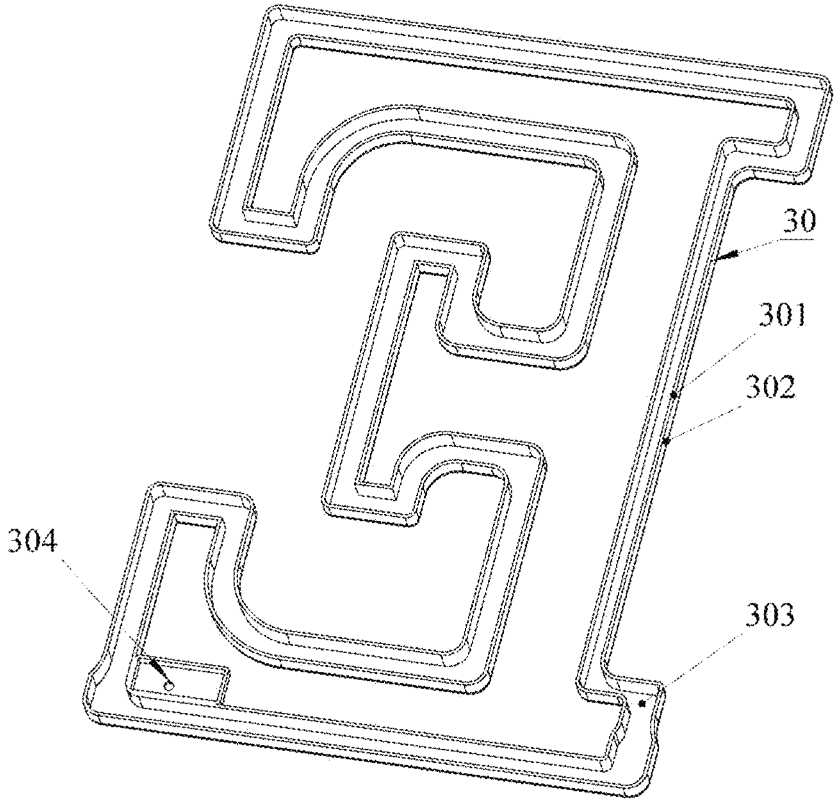
FIG. 8 is a perspective schematic diagram of the lampshade shown in FIG. 7 from another angle.
Figure 9:
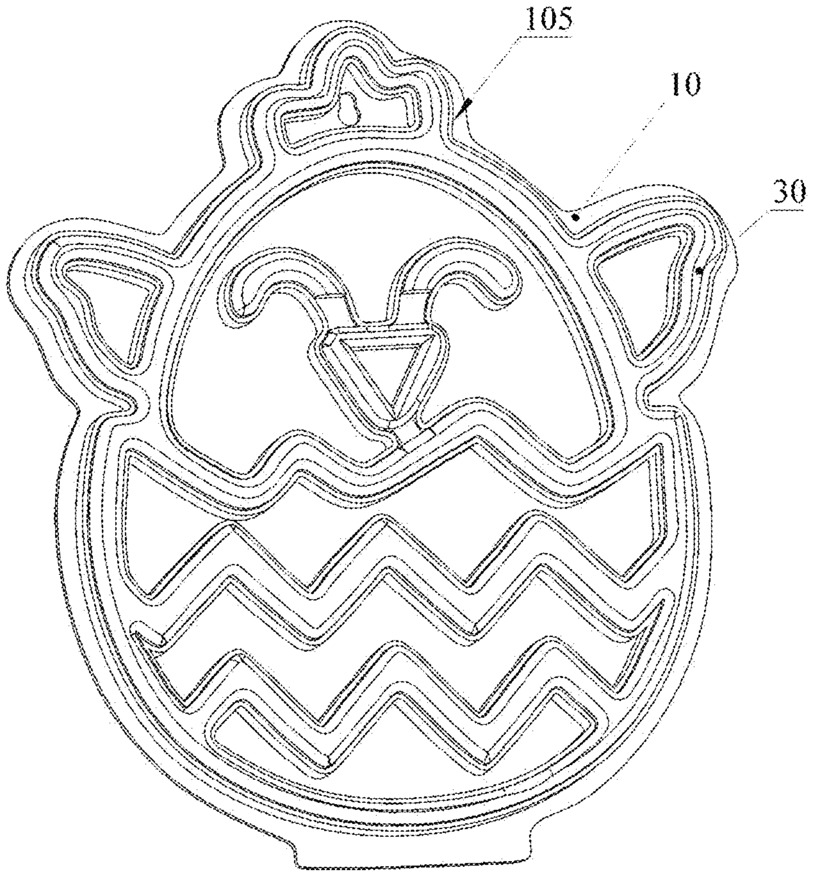
FIG. 9 is a perspective schematic diagram of Decorative lamp design I provided in Embodiment 1 of the present disclosure.

As shown in FIGS. 8 and 9, a light panel 106 is installed inside the lamp groove 105 as the light source. This light panel 106 adopts an integrated molding design, with its overall contour precisely matching the shape of the lamp groove 105, collectively forming the target design (in this embodiment, the target design path resembles an "E" shape). When viewed from above, users can clearly recognize that the shape of the light panel 106 closely aligns with the target design presented by the decorative lamp 100.

In this embodiment, the light panel 106 is a single-piece integrated structure with multiple light-emitting elements 1061 spaced apart thereon. The shape of the light panel 106 perfectly matches the inner cavity of the lamp groove 105, and its overall dimensions are designed to be no larger than the accommodating space of the lamp groove 105, ensuring easy insertion into the lamp groove 105. Compared to solutions that rely on manually physically splicing multiple segments of light-emitting elements (such as traditional light strips) inside the lamp groove, this design completely eliminates the risk of contact failures caused by alignment deviations, loose connectors, or poor soldering. The light panel 106, as a complete light source output device, is ready to use out of the box, requiring no on-site assembly or soldering.

Specifically, the light-emitting elements 1061 are arranged on the surface of the light panel 106 away from the base plate 10 and connected in series. In some embodiments, the light-emitting elements 1061 can also be connected in parallel. The integrated structure gives the light panel 106 excellent deformation adaptability. Even if the design of the lamp groove 105 includes extremely small bending radii or continuous complex curved paths, the light panel 106 can achieve perfect alignment with the groove. This fundamentally avoids the "flying wire" jumper connection issue common in traditional segmented solutions (i.e., using temporary wires to bridge non-continuous points), significantly reducing production process difficulty and enhancing the product's long-term safety and reliability. The light panel 106 is integrated with a charging port 1063 (in this embodiment, a Type-C standard interface directly soldered onto the panel) for power input. The side wall of the lamp groove 105 is provided with a charging opening at the corresponding position (not shown), ensuring the Type-C charging port 1063 is exposed to the outside for direct connection to an external power supply. The light panel 106 further includes a control module 1062 with a control button 10621. Users can control the working state (such as on/off, mode switching, etc.) of the light-emitting elements 1061 by pressing this button.

Figure 10:
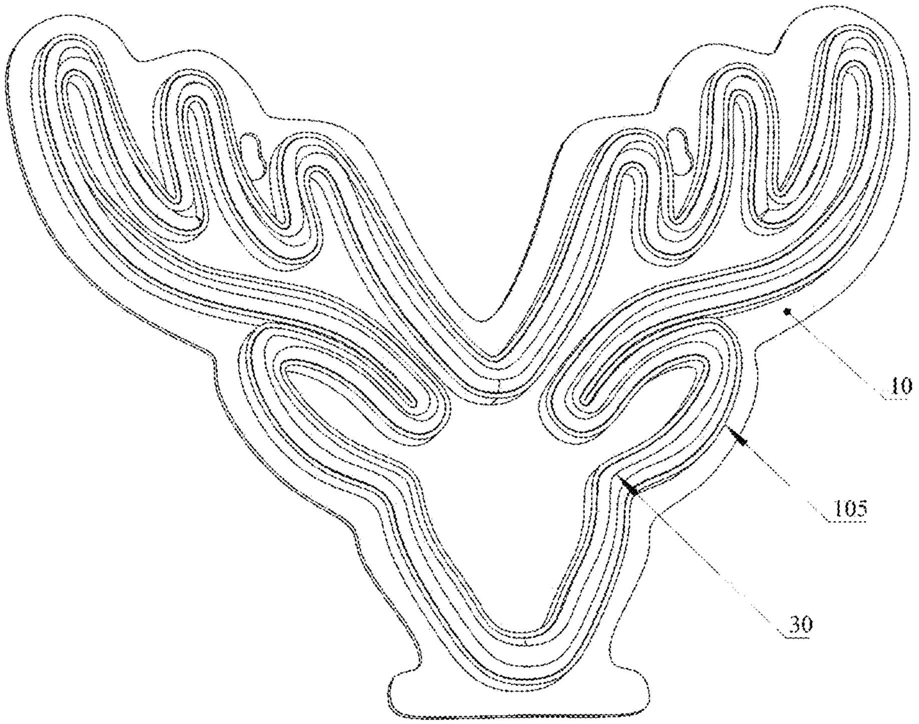
FIG. 10 is a perspective schematic diagram of Decorative lamp design II provided in Embodiment 1 of the present disclosure.
Figure 11:
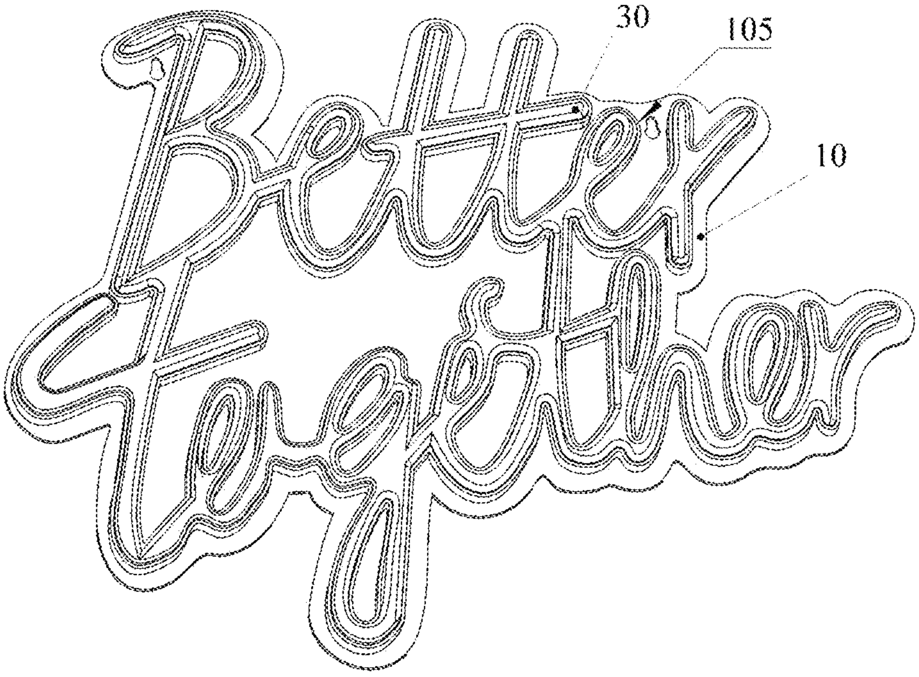
FIG. 11 is a perspective schematic diagram of Decorative lamp design III provided in Embodiment 1 of the present disclosure.
Figure 12:
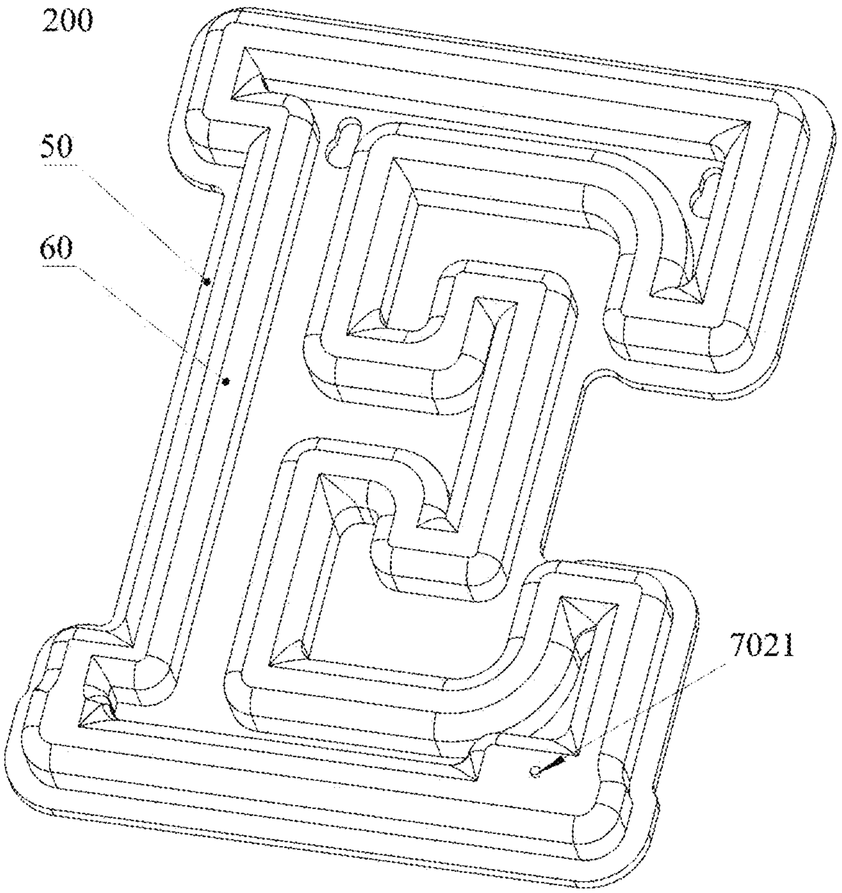
FIG. 12 is a perspective schematic diagram of a neon lamp provided in Embodiment 2 of the present disclosure.
Figure 13:
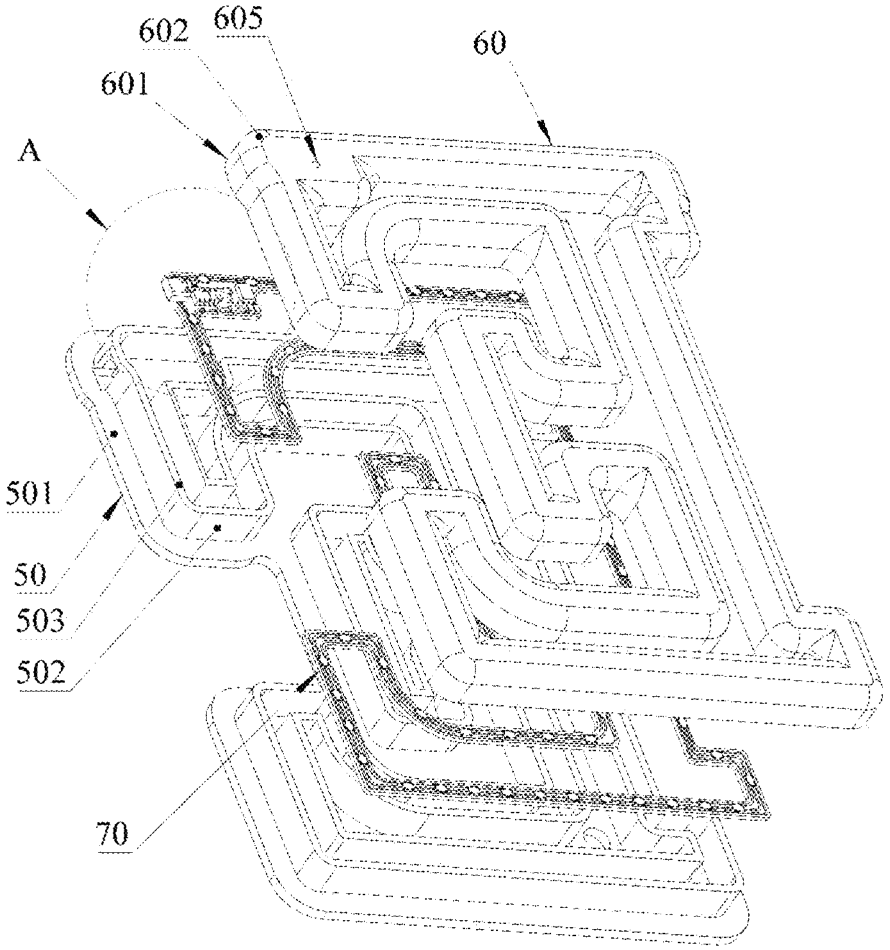
FIG. 13 is an exploded view of the neon lamp shown in FIG. 12.
Figure 14:
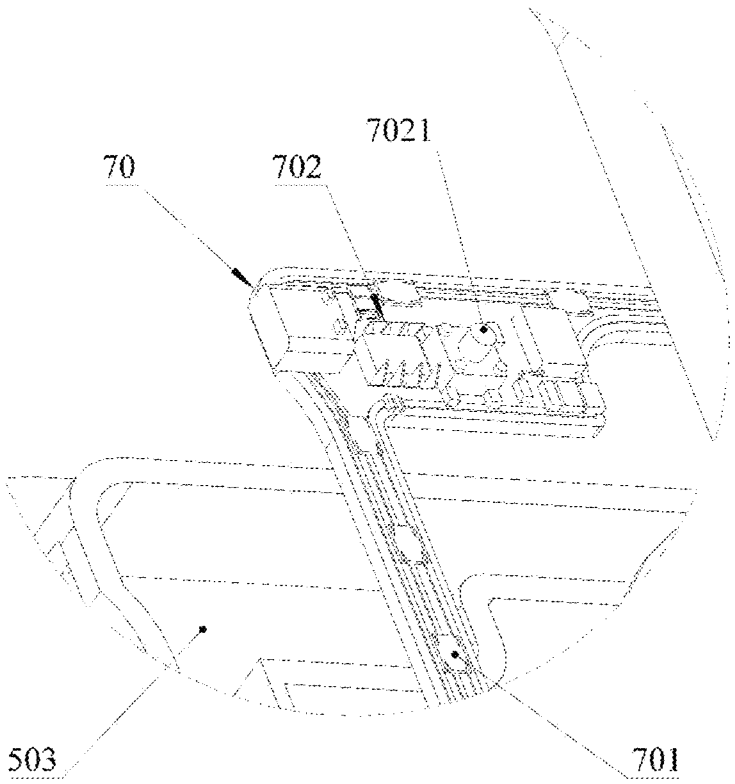
FIG. 14 is an enlarged view of part A shown in FIG. 13.
Figure 15:
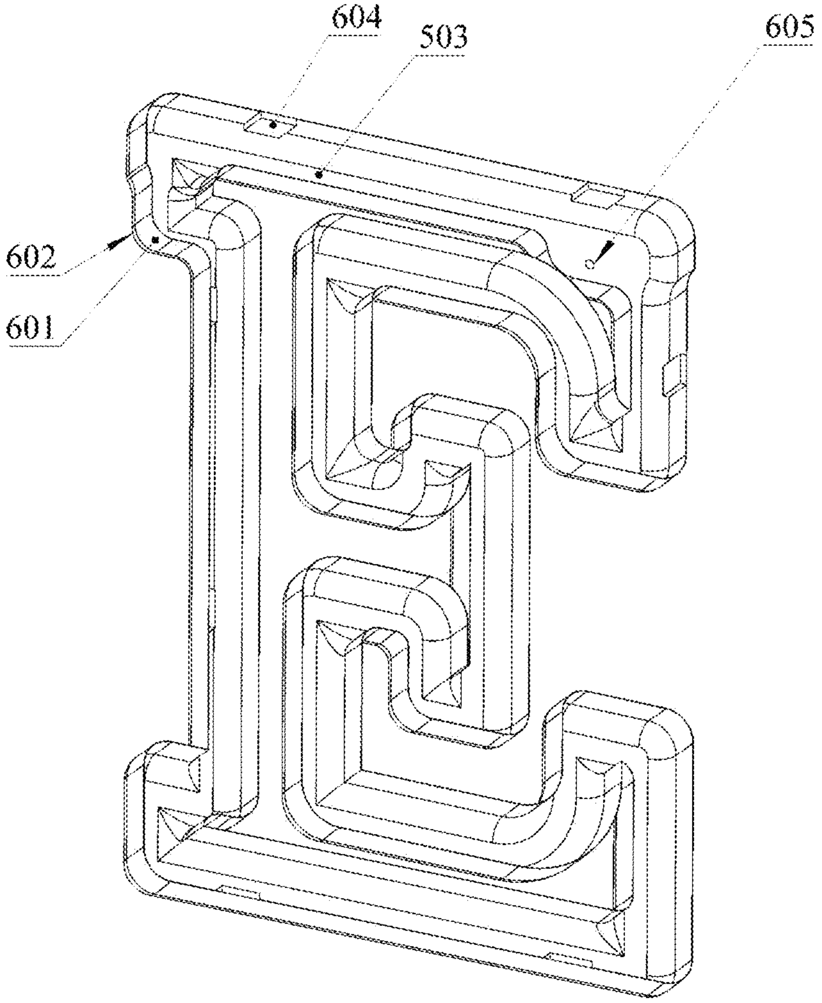
FIG. 15 is a perspective schematic diagram of A lamp cover shown in FIG. 13.

As shown in FIGS. 10 and 11, the lamp groove 105 is provided with a lampshade 30. This lampshade 30 is designed as a strip-shaped body matching the path of the lamp groove 105 (presented as an "E"-shaped target design in this embodiment). When the lampshade 30 is installed in place, its side wall tightly abuts against the inner wall of the lamp groove 105, forming a reliable constraint that ensures the lampshade remains stably positioned within the lamp groove 105. The light panel 106 is precisely accommodated inside the lamp groove 105, specifically between the base plate 10 and the lampshade 30. The dimensions of the lampshade 30 are meticulously designed to be slightly smaller than the opening of the lamp groove 105, allowing it to be embedded smoothly while achieving self-alignment through side wall abutment. One of the core functions of the lampshade 30 is to firmly secure the light panel 106 within the lamp groove 105 through a mechanical structure. This marks a significant improvement over traditional fixation methods (such as relying on adhesive seals).

The lampshade 30 consists of two main functional zones: an embedded part 301 and an exposed part 302. The embedded part 301 is located inside the lamp groove 105, with its side wall abutting the inner wall of the groove to secure the lampshade itself. On the side of the embedded part 301 facing the base plate 10 (i.e., the side away from the exposed part 302), there is a limiting groove 303 that precisely matches the path of the lamp groove 105. When the lampshade 30 is installed, the light panel 106 fits snugly into this limiting groove 303. The design of the limiting groove 303 ensures that the lampshade 30 not only restricts the vertical position of the light panel 106 (preventing upward detachment) but also provides additional lateral restraint through the groove's side walls, significantly enhancing the fixation effect and shock resistance of the light panel 106. This "lamp groove-lampshade" collaborative mechanical constraint mechanism effectively avoids the detachment risks associated with traditional adhesive methods due to aging or vibration, thereby reducing safety hazards such as short circuits or electric shocks caused by panel displacement. After installation, the exposed part 302 extends above the opening of the lamp groove 105, forming the visible light-emitting surface of the lamp. The peripheral edge of the exposed part 302 features a rounded transition design. This structure not only improves the product's aesthetics but, more importantly, optimizes light diffusion. It helps soften and evenly scatter light from the underlying light panel 106, reducing glare and providing a more comfortable, uniform lighting experience.

The lampshade 30 is provided with a control opening 304, whose position precisely aligns with the control button 10621 on the light panel 106. When the lampshade 30 is installed, the top operational part of the control button 10621 passes through the control opening 304, slightly protruding above the surface of the exposed part 302 of the lampshade. Users can directly press the portion of the control button 10621 exposed on the top of the lampshade to effortlessly control the light-emitting element 1061 (such as switching, dimming, or mode changing) without needing to remove the lampshade or perform any additional operations, ensuring an intuitive and convenient user experience.

It should be noted that the base plate 10 and the lamp groove 105, which carries the target design path thereon, are manufactured using an integrated injection molding process. This ensures that the path of the lamp groove 105 accurately reproduces the target design (such as the "E" shape in this embodiment) intended for display by the decorative lamp 100. The light panel 106 adopts a pre-formed monolithic structure, with its shape precisely matching the inner cavity contour of the lamp groove 105. The lampshade 30 is also designed as a strip-like body consistent with the path of the target design.

Specifically, the assembly steps for the decorative lamp in this embodiment are as follows:

- Step 1: The operator only needs to place the pre-formed light panel 106 precisely into the lamp groove 105 along the path direction of the target design. The light panel 106 can be easily and accurately positioned due to its perfect fit with the lamp groove 105.
- Step 2: Next, the lampshade 30 is placed above the lamp groove 105 along the path direction of the target design, and pressed into the lamp groove 105 in a direction perpendicular to the base plate. The side wall of the embedded part 301 of the lampshade 30 tightly abuts against the inner wall of the lamp groove 105, achieving self-positioning and constraint of the lampshade. Simultaneously, the limiting groove 303 (located on the bottom surface of the embedded part 301) of the lampshade 30 fully accommodates and secures the underlying light panel 106. The dimensions of the lampshade 30 ensure that, once embedded, the light panel 106 is firmly restrained within the lamp groove 105 through the combined action of side wall abutment and the limiting groove, eliminating the need for any additional fasteners or adhesives.

After completing the above two steps, the core optical and structural components of the decorative lamp 100 are fully assembled.

The entire core assembly process consists of only two intuitive placement actions (light panel→lampshade), eliminating the need for complex wiring, physical splicing, welding, gluing, screw fastening or other traditional steps in conventional processes. This design significantly reduces the demand for highly skilled workers and assembly time. The operation is simple and easy to learn, markedly lowering labor costs and improving production efficiency.

Key Approval Points: The decorative lamp 100 demonstrated in this disclosure revolutionizes traditional production methods. Through optimized structural design and precise pre-forming of components, the core assembly is completed in just two simple steps—"placing the light panel→pressing in the lampshade", achieving extreme simplification of the production process, effective control of labor costs, and significant enhancement of production efficiency, thus providing strong advantages for large-scale manufacturing.

As shown in FIGS. 12, 13, 14, and 15: This exemplary embodiment illustrates a specific structure of a neon lamp 200. The neon lamp 200 mainly includes a bottom shell plate 50, a light-emitting component (not shown) installed on the bottom shell plate 50, and a lamp cover 60 that covers the light-emitting component and is connected to the bottom shell plate 50. The bottom shell plate 50, the light-emitting component, and the lamp cover 60 work together to enable the neon lamp 200 to clearly display a preset graphic, such as the glowing letter "E" shown in the figure.

The bottom shell plate 50 of the neon lamp 200, serving as the core support structure, is manufactured using a one-piece injection molding process. Its overall shape is designed to closely resemble the target design (e.g., the letter "E").

The bottom shell plate 50 has a top end surface 501 (the bottom end surface is not shown). Two sets of extending walls 502 are arranged on the top end surface 501, jointly enclosing to form an accommodation groove 503 for accommodating a light-emitting component (such as an LED light strip). The extending walls 502 are integrally formed with the bottom shell plate 50, ensuring structural integrity and strength. All extending walls 502 have the same wall height, and the depth of the accommodation groove 503 corresponds to this wall height, designed within the range of 0.5-1 cm. This depth is optimized to effectively conceal and protect the light-emitting component while allowing moderate light transmission, forming a clear light path outline.

The accommodation groove 503 is provided with a light-emitting panel 70 as the light source. This light-emitting panel 70 adopts an integrated molding design, with its overall contour precisely matching the shape of the accommodation groove 503, jointly forming the path of the target design (in this embodiment, approximately resembling the letter "E"). When viewed from above, users can clearly recognize that the shape of the light-emitting panel 70 highly aligns with the target design presented by the neon lamp 200.

The light-emitting panel 70 is a single-piece structure, with multiple light-emitting devices 701 distributed at intervals thereon. Its shape fully matches the inner cavity of the accommodation groove 503, and its overall dimensions do not exceed the accommodation space of the groove, facilitating easy installation. Compared to traditional solutions requiring manual splicing of multiple light-emitting segments (such as light strips) in the accommodation groove 503, this design completely eliminates the risk of contact failures caused by alignment deviations, loose connectors, or poor soldering. As a complete light source output device, the light-emitting panel 70 is ready for use out of the box, requiring no on-site assembly or soldering. The light-emitting panel 70 also is integrated with a control component 702, including an operation button 7021, allowing users to control the on/off state, mode switching, and other working conditions of the light-emitting devices 701 by pressing this button.

The lamp cover 60 consists of a covered part 601 and an uncovered part 602. The covered part 601 forms a covered groove 603 on the side away from the uncovered part 602, with its cavity contour designed to closely match the target design (e.g., an "E" shape). During installation of the lamp cover 60, the accommodation groove 503 is positioned within the covered groove 603, and its extending wall 502 abuts against the inner wall of the covered groove 603, securing the lamp cover 60 in place. The light-emitting panel 20 is precisely housed inside the accommodation groove 503, situated between the bottom shell plate 50 and the lamp cover 60. The size of the accommodation groove 503 is slightly smaller than the opening of the covered groove 603, allowing it to be smoothly embedded and achieve self-positioning by abutting against the inner wall of the covered groove 603. One of the core functions of the lamp cover 60 is to mechanically secure the light-emitting panel 70 within the accommodation groove 503, marking a significant improvement over traditional adhesive sealing methods. Additionally, to enhance the fixation of the light-emitting panel 70, an abutment block 604 (no larger than the opening of the covered groove 603) is provided inside the covered groove 603. When the lamp cover 60 is fitted over the accommodation groove 503, this abutment block 604 abuts against the light-emitting panel 70, working in tandem with the mechanical constraints of the lamp cover 60 and the accommodation groove 503 to further stabilize the light-emitting panel 70.

The top peripheral edge of the uncovered part 602 features a rounded transition design, which not only enhances aesthetics but also optimizes light diffusion. It helps soften and evenly scatter the light emitted by the light-emitting panel 70, reducing glare and providing a more comfortable, uniform lighting experience.

The lamp cover 60 is provided with a through hole 605, which is precisely aligned with the operation button 7021 on the light-emitting panel 70. After installation, the operable portion of the operation button 2021 extends through the through hole 605, slightly protruding from the surface of the uncovered part 602. Users can directly press the exposed part to conveniently control the light-emitting device 701 without needing to remove the lamp cover 60.

It should be noted that the bottom shell plate 50 and its accommodation groove 503, which carries the target design path, are manufactured using an integrated injection molding process. This ensures that the path of the accommodation groove 503 accurately reproduces the target design (e.g., the "E" shape in this embodiment) intended for display by the neon lamp 200. The light-emitting panel 70 adopts a pre-formed monolithic structure, with its shape precisely matching the inner cavity contour of the accommodation groove 503. The lamp cover 60 is also designed as a strip-like body consistent with the target design path, featuring a covered groove 603 whose cavity contour is meticulously designed to closely match the target design (e.g., the "E" shape).

In other words, the assembly steps for the neon lamp 200 in this embodiment are as follows:

Step 1: The operator precisely places the pre-formed light-emitting panel 70 into the accommodation groove 503 along the path direction of the target design. Due to its matching shape with the accommodation groove 503, the light-emitting panel 70 can be easily and accurately positioned.

Step 2: Next, the lamp cover 60 is placed above the accommodation groove 503 along the path direction of the target design and then covers the accommodation groove 503 downward in a direction perpendicular to the bottom shell plate 50. At this stage: the inner wall of the covered groove 603 of the lamp cover 60 tightly abuts against the side wall of the accommodation groove 503, achieving self-positioning and constraint of the lamp cover 60; simultaneously, the abutment block 604 inside the covered groove 603 cooperates with the bottom shell plate 50 to fully restrict the underlying light-emitting panel 70 within the accommodation groove 503; the dimensional design of the covered groove 603 is designed such that after covering, the light-emitting panel 20 is stably confined without additional fasteners or adhesives, relying on the abutment of the inner wall against the side wall of the accommodation groove 503 and the combined effect of the abutment block 604 and the bottom shell plate 50.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A decorative lamp, comprising:

a base plate provided with a lamp groove, wherein the lamp groove is formed along a path of a predetermined design and has an inner cavity contour and an inner wall;

an integrally formed light panel having a shape matching the inner cavity contour of the lamp groove and provided with a light-emitting element, the light panel being entirely placed within the lamp groove;

a lampshade covering the lamp groove and being connected to the base plate;

wherein the lampshade comprises:

an embedded part located within the lamp groove and abutting against the inner wall of the lamp groove to constrain a position of the lampshade itself; and wherein the light panel is accommodated within the lamp groove, such that the lampshade, through the abutment of the embedded part with the inner wall of the lamp groove, constrains the light panel within the lamp groove.

2. The decorative lamp according to claim 1, wherein the base plate is manufactured using an integral injection molding process.

3. The decorative lamp according to claim 2, wherein the base plate and the lamp groove are manufactured using an integral injection molding process.

4. The decorative lamp according to claim 1, wherein the light panel is integrated with a charging port, and a side wall of the lamp groove is correspondingly provided with a charging opening that exposes the charging port.

5. The decorative lamp according to claim 1, wherein the light panel is integrated with a control module, and the control module comprises a control button protruding from a surface of the light panel; and the lampshade is provided with a control opening aligned with the control button; and after installation of the decorative lamp, a top of the control button protrudes through the control opening beyond a surface of the lampshade.

6. The decorative lamp according to claim 1, wherein the lampshade comprises an exposed part extending above the lamp groove, and a top peripheral edge of the exposed part is designed as a rounded transition.

7. The decorative lamp according to claim 6, wherein the surface of the exposed part is provided with a light-transmitting area or a light-shielding pattern to form the predetermined design.

8. The decorative lamp according to claim 1, wherein a bottom surface of the embedded part is provided with a limiting groove matching the path of the lamp groove, and the light panel is accommodated within the limiting groove to achieve bidirectional limiting.

9. The decorative lamp according to claim 1, wherein the base plate is provided with at least one first penetrating hole, and the first penetrating hole is configured for hanging ornamental members.

10. The decorative lamp according to claim 1, wherein the base plate is provided with at least one second penetrating hole, and the second penetrating hole is configured for threading a power cord.

11. A decorative lamp, comprising:

a bottom shell plate provided with an accommodation groove, wherein the accommodation groove is formed according to a path of a predetermined design and has an inner cavity contour and an inner wall;

an integrally formed light-emitting panel having a shape matching the inner cavity contour of the accommodation groove and provided with a light-emitting device, the light-emitting panel being entirely placed within the accommodation groove;

a lamp cover covering the accommodation groove and being connected to the bottom shell plate;

wherein the lamp cover comprises:

a covered part located around an outer periphery of a side wall of the accommodation groove and abutting against the side wall of the accommodation groove to constrain a position of the lamp cover itself; and wherein the light-emitting panel is accommodated within the accommodation groove, such that the lamp cover, through the abutment of the covered part with the side wall of the accommodation groove, constrains the light-emitting panel within the accommodation groove.

12. The decorative lamp according to claim 11, wherein the covered part is provided with a covered groove, and an inner wall of the covered groove abuts against the side wall of the accommodation groove.

13. The decorative lamp according to claim 12, wherein an abutment block is arranged inside the covered groove, which, and when the lamp cover covers the accommodation groove, the abutment block abuts against a surface of the light-emitting panel, and jointly constrains displacement of the light-emitting panel within the accommodation groove in conjunction with the covered part.

14. A decorative lamp, comprising:

an integrally injection-molded base plate, wherein a top surface of the base plate is provided with two sets of upward-extending side walls that jointly enclose to form a lamp groove, and the lamp groove is formed according to a path of a predetermined design and has an inner cavity contour and inner walls;

an integrally formed light panel having a shape matching the inner cavity contour of the lamp groove and being provided with a light-emitting element, the light panel being entirely placed within the lamp groove;

a lampshade covering the lamp groove and being connected to the base plate;

wherein the lampshade comprises:

an embedded part located within the lamp groove and abutting against the inner wall of the lamp groove to constrain a position of the lampshade itself; and wherein the light panel is accommodated within the lamp groove, such that the lampshade, through the abutment of the embedded part with the inner wall of the lamp groove, constrains the light panel within the lamp groove.

15. The decorative lamp according to claim 14, wherein the base plate and the two sets of side walls are manufactured using an integrated injection molding process.

16. The decorative lamp according to claim 14, wherein the light panel is integrated with a charging port, and the side wall of the lamp groove is correspondingly provided with a charging opening that exposes the charging port.

17. The decorative lamp according to claim 14, wherein the light panel is integrated with a control module, and the control module comprises a control button protruding from a surface of the light panel; and the lampshade is provided with a control opening aligned with the control button; and after installation of the decorative lamp, a top of the control button protrudes through the control opening beyond a surface of the lampshade.

18. The decorative lamp according to claim 14, wherein the lampshade comprises an exposed part extending above the lamp groove, and a top peripheral edge of the exposed part is designed as a rounded transition.

19. The decorative lamp according to claim 18, wherein the surface of the exposed part is provided with a light-transmitting area or a light-shielding pattern to form the predetermined design.

20. The decorative lamp according to claim 14, wherein a bottom surface of the embedded part is provided with a limiting groove matching the path of the lamp groove, and the light panel is accommodated within the limiting groove to achieve bidirectional limiting.

* * * * *